(12) United States Patent
Kashiwagi et al.

(10) Patent No.: US 9,983,458 B2
(45) Date of Patent: May 29, 2018

(54) LIQUID CRYSTAL LENS DEVICE AND IMAGE DISPLAY DEVICE

(71) Applicant: KABUSHIKI KAISHA TOSHIBA, Tokyo (JP)

(72) Inventors: Masako Kashiwagi, Kanagawa (JP); Shinichi Uehara, Tokyo (JP); Ayako Takagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 169 days.

(21) Appl. No.: 15/058,897

(22) Filed: Mar. 2, 2016

(65) Prior Publication Data

US 2016/0274423 A1    Sep. 22, 2016

(30) Foreign Application Priority Data

Mar. 18, 2015 (JP) .................. 2015-054202

(51) Int. Cl.
*G02F 1/29* (2006.01)
*G02B 27/22* (2018.01)
*H04N 13/04* (2006.01)

(52) U.S. Cl.
CPC ........... *G02F 1/29* (2013.01); *G02B 27/2214* (2013.01); *H04N 13/0404* (2013.01); *H04N 13/0452* (2013.01); *G02F 2001/294* (2013.01)

(58) Field of Classification Search
CPC . G02F 1/29; G02F 2001/294; G02B 27/2214; G02B 27/225; G02B 27/26; H04N 13/0404; H04N 13/0452; H04N 13/0406
See application file for complete search history.

(56) References Cited

U.S. PATENT DOCUMENTS

| 9,188,816 | B2* | 11/2015 | Kim .................. G02F 1/134363 |
| 2012/0162592 | A1* | 6/2012 | Takagi ............... G02B 27/2214 349/139 |
| 2012/0327350 | A1* | 12/2012 | Chang ............... G02F 1/133371 349/139 |

(Continued)

FOREIGN PATENT DOCUMENTS

| JP | 2013-174695 | 9/2013 |
| JP | 2016-018126 | 2/2016 |

*Primary Examiner* — Joseph L Williams
*Assistant Examiner* — Jose M Diaz
(74) *Attorney, Agent, or Firm* — Finnegan, Henderson, Farabow, Garrett & Dunner, L.L.P.

(57) ABSTRACT

A liquid crystal lens device includes a first electrode unit, a counter electrode and a liquid crystal layer. The first electrode unit includes a first and a second electrode. The liquid crystal layer is provided between the first electrode unit and the counter electrode. A threshold voltage Vth of the liquid crystal layer, an absolute value V1 of a potential difference between the first electrode and the counter electrode, a distance P1 between a center of the first electrode and a center of the second electrode, a thickness d1 of the liquid crystal layer, an effective elastic constant $k_{eff}$ of the liquid crystal layer, a dielectric anisotropy $\Delta\varepsilon$ of the liquid crystal layer, and a dielectric constant $\varepsilon 0$ of a vacuum satisfy $V1 > Vth \times (P1/2)/d1,$ $V1 < Vth \times (P1/d1),$ and $(P1/2)/d1 < \varepsilon 0 \times (\Delta\varepsilon / k_{eff}).$

15 Claims, 7 Drawing Sheets

(56) References Cited

U.S. PATENT DOCUMENTS

2014/0043570 A1* 2/2014 Kim .................. G02F 1/134363
          349/106
2016/0011431 A1   1/2016 Kashiwagi et al.
2016/0291333 A1* 10/2016 Chen ...................... G02B 27/22
2016/0291422 A1* 10/2016 Takagi .............. G02F 1/134309

* cited by examiner

LIQUID CRYSTAL LENS DEVICE AND IMAGE DISPLAY DEVICE

CROSS-REFERENCE TO RELATED APPLICATIONS

This application is based upon and claims the benefit of priority from Japanese Patent Application No. 2015-054202, filed on Mar. 18, 2015; the entire contents of which are incorporated herein by reference.

FIELD

Embodiments described herein relate generally to a liquid crystal lens device and an image display device.

BACKGROUND

There is a liquid crystal lens device in which the distribution of the refractive index is changed according to an applied voltage by utilizing the birefringence of liquid crystal molecules. There is an image display device in which an image display unit is combined with the liquid crystal lens device. By changing the distribution of the refractive index of the liquid crystal optical element, the image display device switches between a state in which an image displayed by the image display unit is caused to be incident on the eyes of a viewer as displayed by the image display unit and a state in which the image displayed by the image display unit is caused to be incident on the eyes of the viewer as multiple parallax images. Thereby, a two-dimensional image display operation and a three-dimensional image display operation are realized. High display quality is desirable in such an image display device.

DETAILED DESCRIPTION

According to one embodiment, a liquid crystal lens device includes a first electrode unit, a counter electrode and a liquid crystal layer. The first electrode unit includes a first electrode and a second electrode. The first electrode extends in a first direction. The second electrode extends in the first direction. The second electrode is arranged with the first electrode in a second direction. The second direction intersects the first direction. The liquid crystal layer is provided between the first electrode unit and the counter electrode. A threshold voltage Vth of the liquid crystal layer, an absolute value V1 of a potential difference between the first electrode and the counter electrode, a distance P1 (micrometers) between a center in the second direction of the first electrode and a center in the second direction of the second electrode, a thickness d1 (micrometers) of the liquid crystal layer in a third direction intersecting the first direction and the second direction, an effective elastic constant $k_{eff}$ (piconewtons) of the liquid crystal layer, a dielectric anisotropy $\Delta\varepsilon$ of the liquid crystal layer, and a dielectric constant $\varepsilon0$ of a vacuum satisfy $V1 > Vth \times (P1/2)/d1$, $V1 < Vth \times (P1/d1)$, and $(P1/2)/d1 < \varepsilon0 \times (\Delta\varepsilon/k_{eff})$.

According to another embodiment, a liquid crystal lens device includes a first electrode unit, a counter electrode and a liquid crystal layer. The first electrode unit includes a first electrode and a second electrode. The first electrode extends in a first direction. The second electrode extends in the first direction. The second electrode is arranged with the first electrode in a second direction. The second direction intersects the first direction. The liquid crystal layer is provided between the first electrode unit and the counter electrode. A threshold voltage Vth of the liquid crystal layer, an absolute value V1 of a potential difference between the first electrode and the counter electrode, a focal length f of the liquid crystal layer, a distance P1 (micrometers) between a center in the second direction of the first electrode and a center in the second direction of the second electrode, a thickness d1 (micrometers) of the liquid crystal layer in a third direction intersecting the first direction and the second direction, an effective elastic constant $k_{eff}$ (piconewtons) of the liquid crystal layer, a dielectric anisotropy $\Delta\varepsilon$ of the liquid crystal layer, and a dielectric constant $\varepsilon0$ of a vacuum satisfy $V1 > Vth \times (f/P1)$, $V1 < Vth \times (P1/d1)$, and $(P1/2)/d1 < \varepsilon0 \times (\Delta\varepsilon/k_{eff})$.

According to another embodiment, an image display device includes a liquid crystal lens device and an image display unit. The liquid crystal lens device includes a first electrode unit, a counter electrode and a liquid crystal layer. The first electrode unit includes a first electrode and a second electrode. The first electrode extends in a first direction. The second electrode extends in the first direction. The second electrode is arranged with the first electrode in a second direction. The second direction intersects the first direction. The liquid crystal layer is provided between the first electrode unit and the counter electrode. The threshold voltage Vth of the liquid crystal layer, an absolute value V1 of a potential difference between the first electrode and the counter electrode, a distance P1 (micrometers) between a center in the second direction of the first electrode and a center in the second direction of the second electrode, a thickness d1 (micrometers) of the liquid crystal layer in a third direction intersecting the first direction and the second direction, an effective elastic constant $k_{eff}$ (piconewtons) of the liquid crystal layer, a dielectric anisotropy $\Delta\varepsilon$ of the liquid crystal layer, and a dielectric constant $\varepsilon0$ of a vacuum satisfy $V1 > Vth \times (P1/2)/d1,$ $V1 < Vth \times (P1/d1),$ and $(P1/2)/d1 < \varepsilon 0 \times (\Delta \varepsilon / k_{eff}).$ The image display unit includes a display unit. The display unit emits light including image information. The image display unit and the liquid crystal lens device overlap in the third direction.

According to another embodiment, an image display device includes a liquid crystal lens device and an image display unit. The liquid crystal lens device includes a first electrode unit, a counter electrode and a liquid crystal layer. The first electrode unit includes a first electrode and a second electrode. The first electrode extends in a first direction. The second electrode extends in the first direction. The second electrode is arranged with the first electrode in a second direction. The second direction intersects the first direction. The liquid crystal layer is provided between the first electrode unit and the counter electrode. The threshold voltage Vth of the liquid crystal layer, an absolute value V1 of a potential difference between the first electrode and the counter electrode, a focal length f of the liquid crystal layer, a distance P1 (micrometers) between a center in the second direction of the first electrode and a center in the second direction of the second electrode, a thickness d1 (micrometers) of the liquid crystal layer in a third direction intersecting the first direction and the second direction, an effective elastic constant $k_{eff}$ (piconewtons) of the liquid crystal layer, a dielectric anisotropy $\Delta \varepsilon$ of the liquid crystal layer, and a dielectric constant $\varepsilon 0$ of a vacuum satisfy $V1 > Vth \times (f/P1),$ $V1 < Vth \times (P1/d1),$ and $(P1/2)/d1 < \varepsilon 0 \times (\Delta \varepsilon / k_{eff}).$ The image display unit includes a display unit. The display unit emits light including image information. The image display unit and the liquid crystal lens device overlap in the third direction.

Various embodiments of the invention will be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In this specification and each drawing, components similar to ones described in reference to an antecedent drawing are marked with the same reference numerals, and a detailed description is omitted as appropriate.

First Embodiment

Figure 1:
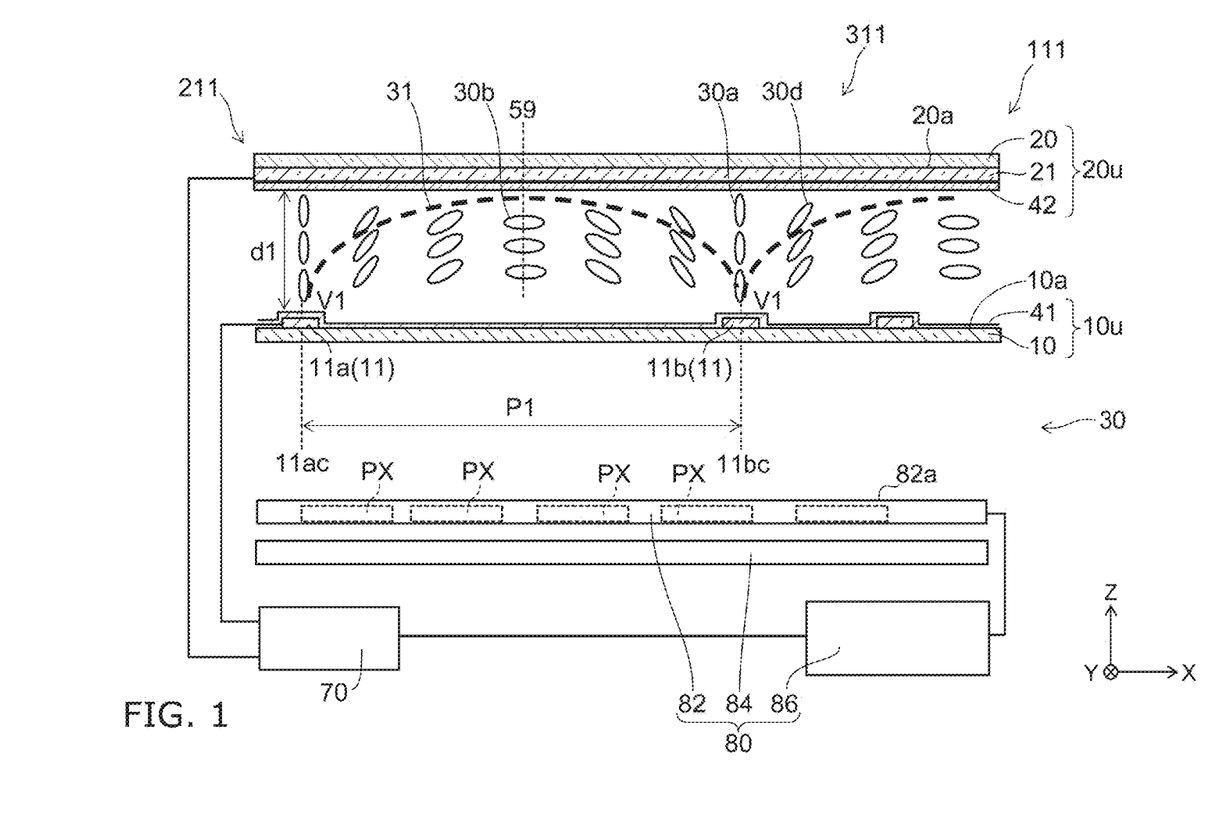
FIG. 1 is a schematic cross-sectional view showing a liquid crystal lens device and an image display device according to a first embodiment.

FIG. 1 is a schematic cross-sectional view showing a liquid crystal lens device and an image display device according to a first embodiment.

As shown in FIG. 1, the image display device 311 according to the embodiment includes the liquid crystal lens device 211 and an image display unit 80. The image display unit 80 displays an image. The image display unit 80 may include any display device. For example, a liquid crystal display device, an organic EL display device, a plasma display, etc., may be used.

The liquid crystal lens device 211 includes a liquid crystal optical element 111 and a drive unit 70. For example, the liquid crystal optical element 111 is provided on the image display unit 80. For example, the liquid crystal optical element 111 functions as a liquid crystal GRIN lens (gradient index lens). The liquid crystal optical element 111 has a refractive index distribution 31. The refractive index distribution 31 is changeable. One state of the refractive index distribution 31 corresponds to a first state in which an image displayed by the image display unit 80 is caused to be incident as displayed by the image display unit 80 on the eyes of a viewer. Another state of the refractive index distribution 31 corresponds to a second state in which the image displayed by the image display unit 80 is caused to be incident on the eyes of the viewer as multiple parallax images.

By changing the distribution of the refractive index of the liquid crystal optical element 111 in the image display device 311, it is possible to selectively switch between a display of a two-dimensional image (hereinbelow, called a 2D display) and a display of a three-dimensional image (hereinbelow, called a 3D display) by which stereoscopic viewing by the naked eyes can be performed.

The drive unit 70 is electrically connected to the liquid crystal optical element 111. For example, the drive unit 70 switches between the first state and the second state of the liquid crystal optical element 111. The drive unit 70 switches the liquid crystal optical element 111 to the first state when performing the 2D display and switches the liquid crystal optical element 111 to the second state when performing the 3D display.

An image signal is input to the image display unit 80 from a recording medium, an external input, etc. The image display unit 80 displays an image corresponding to the image signal that is input. When performing the 2D display, the image display unit 80 displays an image for the 2D display; and when performing the 3D display, the image display unit 80 displays an image for the 3D display.

The liquid crystal optical element 111 includes a first substrate unit 10u, a second substrate unit 20u, and a liquid crystal layer 30. The first substrate unit 10u includes a first substrate 10 and multiple first electrode units 11. The first substrate 10 has a first major surface 10a. The multiple first electrode units 11 are provided on the first major surface 10a. Each of the multiple first electrode units 11 extends in a first direction. The multiple first electrode units 11 are arranged in a second direction intersecting the first direction. In FIG. 1, two of the multiple first electrode units 11 are shown. The number of multiple first electrode units 11 is arbitrary.

The first direction is taken as a Y-axis direction. A direction parallel to the first major surface 10a and perpendicular to the Y-axis direction is taken as an X-axis direction. A direction perpendicular to the X-axis direction and the Y-axis direction is taken as a Z-axis direction. For example, the multiple first electrode units 11 are arranged in the X-axis direction. In the example, the second direction is the X-axis direction. The second direction is not limited to the X-axis direction and may be any direction intersecting the first direction.

Two most proximal first electrode units 11 of the multiple first electrode units 11 are focused upon. One of the two most proximal first electrode units 11 is taken as a first major electrode (a first electrode) 11a. The other of the two most proximal first electrode units 11 is taken as a second major electrode (a second electrode) 11b.

A central axis 59 is between the two most proximal first electrode units 11 (the first major electrode 11a and the second major electrode 11b). When projected onto the X-Y plane (a plane parallel to the first major surface 10a), the central axis 59 is parallel to the Y-axis direction and passes through the midpoint of a line segment connecting a center 11ac in the X-axis direction of the first major electrode 11a and a center 11bc in the X-axis direction of the second major electrode 11b.

The second substrate unit 20u includes a second substrate 20 and a counter electrode 21. The second substrate 20 has a second major surface 20a opposing the first major surface 10a. Each of the multiple first electrode units 11 is provided between the first substrate 10 and the second substrate 20.

The counter electrode 21 is provided between the first substrate unit 10u and the second substrate 20. In other words, the counter electrode 21 is provided on the second major surface 20a. The counter electrode 21 opposes each of the multiple first electrode units 11.

The first substrate 10, the first electrode units 11, the second substrate 20, and the counter electrode 21 are transmissive to light. Specifically, the first substrate 10, the first electrode units 11, the second substrate 20, and the counter electrode 21 are transparent.

The first substrate 10 and the second substrate 20 include, for example, a transparent material such as glass, a resin, etc. The first substrate 10 and the second substrate 20 have plate configurations or sheet configurations. The thicknesses of the first substrate 10 and the second substrate 20 are, for example, not less than 50 micrometers (μm) and not more than 2000 μm. However, the thicknesses are arbitrary.

The first electrode units 11 and the counter electrode 21 include, for example, an oxide including at least one (one type of) element selected from the group consisting of In, Sn, Zn, and Ti. These electrodes include, for example, ITO. For example, at least one of $In_2O_3$ or $SnO_3$ may be used. The thicknesses of these electrodes are, for example, about 200 nanometers (nm) (e.g., not less than 100 nm and not more than 350 nm). For example, the thickness of each electrode is set to a thickness that can obtain a high transmittance for visible light.

The arrangement pitch of the first electrode units 11 (the distance between the centers in the X-axis direction of every two most proximal first electrode units 11) is, for example, not less than 50 μm and not more than 1000 μm. The arrangement pitch is set to match the desired specifications (the characteristics of the gradient index lens). The length (the width) along the X-axis direction of the first electrode units 11 is, for example, not less than 5 μm and not more than 300 μm.

The liquid crystal layer 30 is provided between the first substrate unit 10u and the second substrate unit 20u. The liquid crystal layer 30 is provided between the counter electrode 21 and the first electrode units 11. The liquid crystal layer 30 includes a liquid crystal material. The liquid crystal material includes a nematic liquid crystal (having a nematic phase at the temperature of use of the liquid crystal optical element 111). The liquid crystal material has a positive dielectric anisotropy or a negative dielectric anisotropy $\Delta\varepsilon$, a refractive index $n_o$ for ordinary rays, a refractive index $n_e$ for extraordinary rays, and an effective elastic constant $k_{eff}$. In the case of the positive dielectric anisotropy, the initial alignment of the liquid crystal of the liquid crystal layer 30 (the alignment when a voltage is not applied to the liquid crystal layer 30) is, for example, a horizontal alignment. In the case of the negative dielectric anisotropy, the initial alignment of the liquid crystal of the liquid crystal layer 30 is a vertical alignment. A threshold voltage Vth (volts (V)) which is the voltage when the liquid crystal starts to align is expressed by Formula 1 using a dielectric constant ε0 (faradays/meter (F/m)) of a vacuum, the dielectric anisotropy $\Delta\varepsilon$ of the liquid crystal material, and the effective elastic constant $k_{eff}$ (piconewtons (pN)) of the liquid crystal material.

[Formula 1]

$$Vth = \pi\sqrt{\frac{K_{eff}}{\varepsilon 0 \Delta\varepsilon}} \tag{1}$$

The effective elastic constant $k_{eff}$ is expressed by a splay elastic constant $k_{11}$, a twist elastic constant $k_{22}$, and a bend elastic constant $k_{33}$. The effective elastic constant $k_{eff}$ is expressed using Formula 2 for any twist angle $\omega_m$. For example, these elastic constant are obtained by measuring the threshold voltages of liquid crystal layers having different alignments.

$$k_{eff} = k_{11} + (\omega_m/\pi)^2 \times (k_{33} - 2k_{22}) \tag{2}$$

Formula 2 is as follows in the case where the twist angle $\omega_m$ is, for example, 90 degrees, i.e., $\omega_m = \pi/2$.

$$k_{eff} = k_{11} - 0.5k_{22} + 0.25k_{33}$$

A length (a thickness) d1 (micrometers (μm)) of the liquid crystal layer 30 along the Z-axis direction is determined using Formula 3 based on the arrangement pitch of the first electrode units 11, i.e., a lens pitch P1, any lens focal length f, and the relationship of the birefringence (the refractive index $n_o$ and the refractive index $n_e$). For example, the thickness d1 of the liquid crystal layer 30 is about 25 μm in the case where the refractive index $n_o$ for ordinary rays is 1.5, the refractive index $n_e$ for extraordinary rays is 1.7, the lens pitch P1 is 200 μm, and the focal length f is 1 mm. In other words, the thickness d1 in the Z-axis direction of the liquid crystal layer 30 is the distance along the Z-axis direction between the first substrate unit 10u and the second substrate unit 20u.

$$d1 = (P1/2)^2/2f(n_e - n_o) \tag{3}$$

The thickness d1 is favorably d1≤P1/2. More favorably, d1≤P1/4.

The drive unit 70 is electrically connected to each of the first electrode units 11 and the counter electrode 21. In FIG. 1, some of the interconnects between the drive unit 70 and the first electrode units 11 are not shown for easier viewing of the drawing.

Each of the multiple liquid crystal molecules included in the liquid crystal layer 30 has the horizontal alignment when a voltage is not applied between the first major electrode 11a and the counter electrode 21 and between the second major electrode 11b and the counter electrode 21. Thereby, a substantially uniform refractive index distribution is obtained in the X-axis direction and the Y-axis direction. Therefore, when the voltage is not applied, the travel direction of the light including the image displayed by a display unit 82 substantially is not changed. In other words, when the voltage is not applied, the liquid crystal optical element 111 is in the first state. A voltage such that the refractive index distribution does not occur in the liquid crystal layer 30 is applied to the first major electrode 11a, the second major electrode 11b, and the counter electrode 21 of the liquid crystal optical element 111.

When switching the liquid crystal optical element 111 from the first state to the second state, the drive unit 70 sets the potentials of the first major electrode 11a, the second major electrode 11b, and the counter electrode 21. The drive unit 70 sets the absolute value of the potential difference between the first major electrode 11a and the counter electrode 21 and between the second major electrode 11b and the counter electrode 21 to V1. In other words, V1 is the absolute value of the voltage between the first major electrode 11a and the counter electrode 21 and between the second major electrode 11b and the counter electrode 21. Hereinbelow, the absolute value of the voltage is called the first voltage V1 for convenience. The drive unit 70 applies the first voltage V1 between the first major electrode 11a and the counter electrode 21 and between the second major electrode 11b and the counter electrode 21. The same voltage is applied to the first major electrode 11a and the second major electrode 11b. In the case where the potentials are different between the first major electrode 11a and the second major electrode 11b, the first voltage V1 is taken as the difference between the potential of the counter electrode 21 and the average potential of the first major electrode 11a and the second major electrode 11b.

For example, in the case where electrodes other than the first electrode units 11 are provided, the first voltage V1 is the maximum voltage of the electrodes. Thus, when the first voltage V1 is applied, the tilt angle of the liquid crystal molecules becomes large in a first portion 30a of the liquid crystal layer 30 where the first electrode unit 11 and the counter electrode 21 oppose each other. For example, the liquid crystal molecules approach the vertical alignment in the first portion 30a. On the other hand, the liquid crystal molecules remain in the horizontal alignment in a second portion 30b of the liquid crystal layer 30 at the central vicinity of the two mutually-adjacent first electrode units 11. The angle (the tilt angle) of the liquid crystal molecules changes in the portion between the first portion 30a and the second portion 30b to gradually approach the vertical alignment from the second portion 30b toward the first portion 30a. The angle of the long axis of the liquid crystal molecules changes in the Z-X plane. The angle of the long axis of the liquid crystal molecules changes using the Y-axis direction as the rotation axis.

The liquid crystal molecules have birefringence. The refractive index in the long-axis direction of the liquid crystal molecules for polarized light is higher than the refractive index of the liquid crystal molecules in the short-axis direction. When the angle of the liquid crystal molecules is changed as recited above, the refractive index of the liquid crystal layer 30 for linearly polarized light traveling in the Z-axis direction and having the polarizing axis oriented in the X-axis direction is high in the second portion 30b of the liquid crystal layer 30 and gradually decreases toward the first portion 30a. Thereby, a refractive index distribution that has a convex lens configuration (a semicircular configuration) is formed.

The multiple first electrode units 11 extend along the Y-axis direction. Therefore, the refractive index distribution of the liquid crystal layer 30 has a cylindrical lens configuration extending along the Y-axis direction when applying the voltage. The multiple first electrode units 11 are arranged in the X-axis direction. Therefore, the refractive index distribution of the liquid crystal layer 30 when applying the voltage has a lenticular lens configuration in which cylindrical lenses extending along the Y-axis direction are multiply arranged in the X-axis direction when the liquid crystal layer 30 is viewed as an entirety.

For example, the polarity of the first voltage V1 may be changed periodically. For example, the potential of the counter electrode 21 may be fixed; and the potential of the first electrode units 11 may be changed by alternating current. The polarity of the potential of the counter electrode 21 may be changed periodically; and the potential of the first electrode units 11 may be changed with the reverse polarity in conjunction with the change of the polarity of the potential of the counter electrode 21. In other words, common inversion driving may be performed. Thereby, the power supply voltage of the drive circuit can be small; and the breakdown voltage specifications of the drive IC are relaxed.

The refractive index distribution having the convex lens configuration formed in the liquid crystal layer 30 opposes multiple pixels PX of the display unit 82 arranged in the X-axis direction. In the example, among four pixels PX arranged in the X-axis direction, the two pixels PX positioned at the vicinity of the central axis 59 are opposed by the portion (the second portion 30b) of the refractive index distribution of the liquid crystal layer 30 where the refractive index is high.

The refractive index distribution of the liquid crystal layer 30 when applying the voltage causes the light (the image) emitted from the pixels PX to travel toward the eyes of the viewer. Thereby, the image that is formed by the four pixels PX opposing the refractive index distribution becomes a parallax image. In other words, in the example, four parallax images are formed by the four pixels PX arranged in the X-axis direction. The parallax image for the right eye is selectively incident on the right eye of the viewer; and the parallax image for the left eye is selectively incident on the left eye of the viewer. Thereby, the 3D display is possible. In other words, the liquid crystal optical element 111 is switched to the second state when the voltages are applied to the multiple first electrode units 11 (the first major electrode 11a and the second major electrode 11b) and the counter electrode 21.

When the liquid crystal optical element 111 is in the first state, the light that is emitted from the pixels PX travels straight and is incident on the eyes of the viewer. Thereby, the 2D display is possible. In the 2D display, a normal 2D image can be displayed with a resolution that is greater than that of the 3D display by a factor of the number of parallax images (in the example, four times).

Color filters that include the three primary colors RGB may be provided respectively at the multiple pixels PX. Thereby, a color display is possible. Other than the three primary colors RGB, the color filters may further include white (colorless) and other color components.

Thus, the liquid crystal optical element 111 of the image display device 311 changes the refractive index distribution of the liquid crystal layer 30 by whether or not the voltage is applied to the counter electrode 21 and the multiple first electrode units 11. Thereby, the 2D display and the 3D display are switched.

Here, as shown in FIG. 1, the lens pitch P1 is the distance (hereinbelow, called the distance P1) between the center 11ac in the X-axis direction of the first major electrode 11a and the center 11bc in the X-axis direction of the second major electrode 11b.

Figure 2:
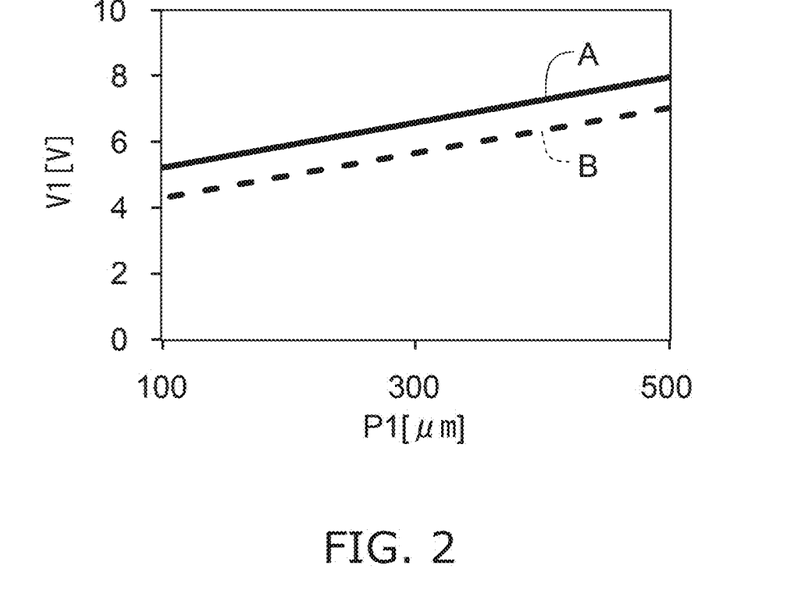
FIG. 2 is a graph of characteristics of the liquid crystal lens device and the image display device according to the first embodiment.

FIG. 2 is a graph of characteristics of the liquid crystal lens device and the image display device according to the first embodiment.

The vertical axis is the first voltage V1 (having units of volts (V)); and the horizontal axis is the distance P1 (having units of μm).

FIG. 2 is the results of a simulation of the first voltage V1 when the distance P1 is changed for a material A and a material B that have different effective elastic constant $k_{eff}$. In the example, the first voltage V1 is plotted for the distance P1 when the lens condensing ratio of the liquid crystal lens device 211 is 80% or more. That is, for voltages outside the graph, the refractive index distribution of the liquid crystal layer 30 is inappropriate; and the lens condensing performance undesirably degrades easily. By appropriately setting the refractive index distribution of the liquid crystal layer 30, the refractive index distribution of the liquid crystal layer 30 can function as a liquid crystal lens having high lens condensing performance.

For example, by setting the lens condensing ratio to be 80% or more, the scattering of the light and the like are suppressed; crosstalk of the parallax images and the like for the 3D display, etc., are suppressed; and high display quality can be obtained.

FIG. 3A to FIG. 3D are schematic views showing refractive index distributions of the liquid crystal layer 30.

Figure 3A:
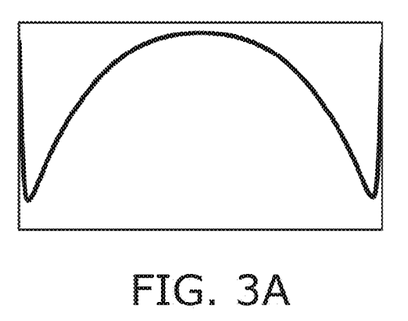
FIG. 3A to FIG. 3D are schematic views showing refractive index distributions of the liquid crystal layer.

FIG. 3A shows a refractive index distribution having an ideal configuration in which the first voltage V1 is set appropriately.

Figure 3B:
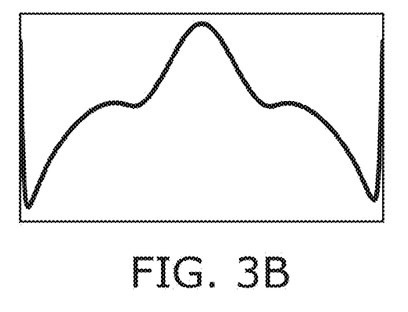
Figure 3C:
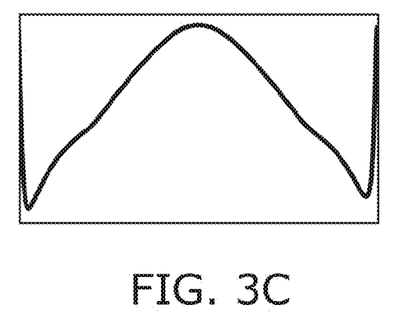

FIG. 3B and FIG. 3C show refractive index distributions when the first voltage V1 is too high.

Figure 3D:
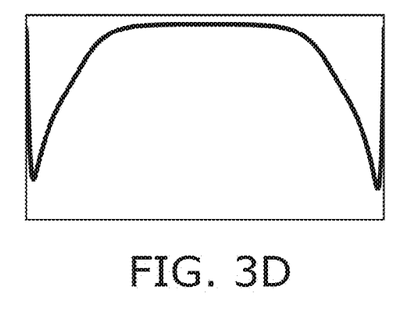

FIG. 3D shows the refractive index distribution when the first voltage V1 is too low or when the thickness d1 is too thin.

In FIG. 3A to FIG. 3D, the horizontal axis is the position in the lens pitch direction of the liquid crystal layer 30; and the vertical axis is the refractive index.

In the liquid crystal optical element 111 of the embodiment, the threshold voltage Vth (V), the first voltage V1 (V), the thickness d1 (μm), the distance P1 (μm), the effective elastic constant $k_{eff}$ (pN), the dielectric anisotropy Δε, and the dielectric constant ε0 (F/m) of a vacuum satisfy the relationships of the following Formula 4 to Formula 6.

$$V1 > Vth \times (P1/2)/d1 \tag{4}$$

$$V1 < Vth \times (P1/d1) \tag{5}$$

$$(P1/2)/d1 < \varepsilon0 \times (\Delta\varepsilon/k_{eff}) \tag{6}$$

However, the thickness d1 is determined using Formula 3.

The inventors discovered as a result of performing simulations that an ideal refractive index distribution such as that shown in FIG. 3A is obtained when the relationships of Formula 4 to Formula 6 recited above are satisfied.

In the liquid crystal optical element 111, the distance P1 is set to satisfy the relationship of Formula 4. The drive unit 70 sets the first voltage V1 to satisfy the relationship of Formula 4. In other words, the drive unit 70 sets the potentials of the counter electrode 21 and the multiple first electrode units 11 to satisfy the relationship of Formula 4. In Formula 4, the units of the distance P1 are μm; and the units of the first voltage V1 are V. The thickness d1 is determined to satisfy the relationship of Formula 3.

In the liquid crystal optical element 111, the distance P1, the lens focal length f, the threshold voltage Vth, and the first voltage V1 may be set to satisfy the relationship of the following Formula 7.

$$V1 > Vth \times (f/P1) \tag{7}$$

For example, the dielectric anisotropy Δε of the material A is 9.2. The effective elastic constant $k_{eff}$ is 14.975 (pN). The distance P1 is 260 μm. The focal length f is 970 μm. In such a case, the thickness d1 is 40 μm; the threshold voltage Vth is 1.347 V; and the first voltage V1 is 6.3 V.

The upper limit of the first voltage V1 is determined using Formula (5). In other words, the lower limit of the first voltage V1 is determined using Formula (4) or Formula (7); and the upper limit of the first voltage V1 is determined using Formula (5).

Figure 4A:
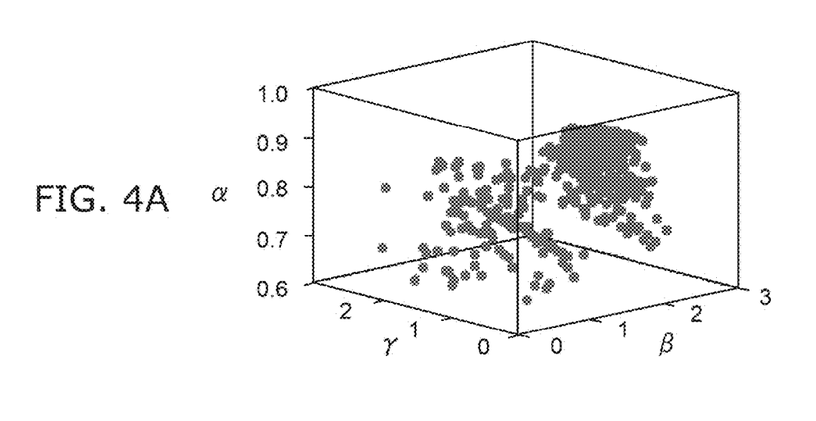
FIG. 4A to FIG. 4C are graphs of characteristics of the liquid crystal lens device and the image display device according to the first embodiment.
Figure 4B:
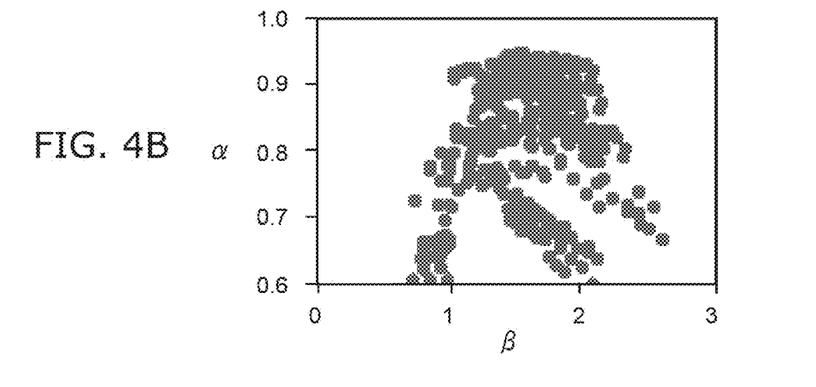
Figure 4C:
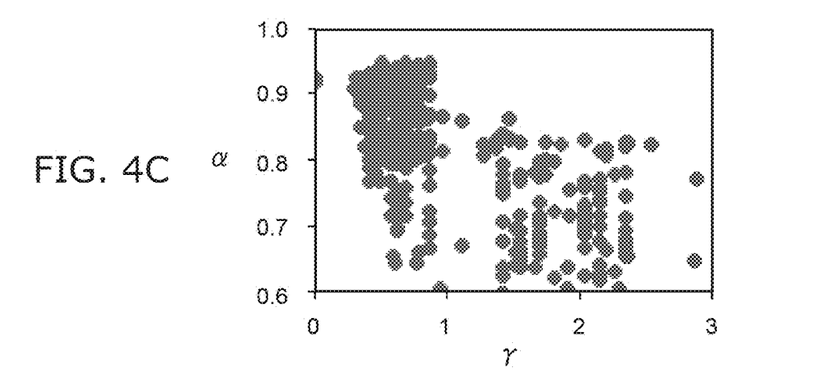

FIG. 4A to FIG. 4C are graphs of characteristics of the liquid crystal lens device and the image display device according to the first embodiment.

FIG. 4A is a three-axis graph of the relationship between a condensing ratio α, a ratio β, and a ratio γ.

FIG. 4B is a two-axis graph of the relationship between the condensing ratio α and the ratio β.

FIG. 4C is a two-axis graph of the relationship between the condensing ratio α and the ratio γ.

The ratio β is $V1/(Vth \times (P1/2)/d1)$.

The ratio γ is $((P1/2)/d1)/(\varepsilon0 \times (\Delta\varepsilon/k_{eff}))$.

The conditions of Formula 4 mean that $V1/(Vth \times (P1/2)/d1) > 1$, i.e., β>1.

The conditions of Formula 5 mean that $V1/(Vth \times (P1/2)/d1) < 2$, i.e., β<2.

As shown in FIG. 4B, it can be seen that the condensing ratio α concentrates where the condensing ratio α is 0.8 (80%) or more in the range of 1<β<2.

The conditions of Formula 6 mean that $((P1/2)/d1)/(\varepsilon0 \times (\Delta\varepsilon/k_{eff})) < 1$, i.e., γ<1.

As shown in FIG. 4C, it can be seen that the condensing ratio α concentrates where the condensing ratio α is 0.8 (80%) or more in the range of γ<1.

Thus, according to the embodiment, a high condensing ratio can be obtained by satisfying Formula 4 to Formula 6.

The pretilt of the liquid crystal layer 30 will now be described.

The alignment of the liquid crystal of the liquid crystal layer 30 may have a pretilt. In the pretilt, for example, a director 30d (the axis in the long-axis direction of the liquid crystal molecules) of the liquid crystal is oriented from the first substrate unit 10u toward the second substrate unit 20u along the +X direction from the first major electrode 11a toward the second major electrode 11b.

The pretilt angle is the angle between the X-Y plane and the director 30d of the liquid crystal. In the case of the horizontal alignment, the pretilt angle is, for example, greater than 0° and less than 45°. For the vertical alignment, the pretilt angle is, for example, greater than 45° and less than 90°.

For convenience in the specification, the horizontal alignment refers to the case where the pretilt angle is less than 45°; and for convenience, the vertical alignment refers to the case where the pretilt angle exceeds 45°.

For example, the direction of the pretilt can be determined by a crystal rotation method, etc. Also, the direction of the pretilt can be determined by changing the alignment of the liquid crystal by applying a voltage to the liquid crystal layer 30 and by observing the optical characteristics of the liquid crystal layer 30 at this time.

In the case where alignment processing of the first substrate unit 10u is performed by, for example, rubbing, etc., the direction of the alignment processing is along the +X direction. In the example, the direction of the alignment processing of the first substrate unit 10u is, for example, the +X direction. The axis of the director 30d may be parallel or non-parallel to the +X direction when the director 30d of the liquid crystal is projected onto the X-Y plane. The direction of the pretilt has a +X direction component when the direction of the pretilt is projected onto the X-axis.

The alignment direction of the liquid crystal layer 30 at the vicinity of the second substrate unit 20u is antiparallel to the alignment direction of the liquid crystal layer 30 at the vicinity of the first substrate unit 10u. In the example, the direction of the alignment processing of the second substrate unit 20u is the −X direction. In other words, the initial alignment is not a splay alignment.

The first substrate unit 10u further includes a first alignment film 41. The first alignment film 41 is provided between the first substrate 10 and the liquid crystal layer 30. The multiple first electrode units 11 are provided between the first alignment film 41 and the first substrate 10. The second substrate unit 20u further includes a second alignment film 42. The second alignment film 42 is provided between the second substrate 20 and the liquid crystal layer 30. The counter electrode 21 is provided between the second alignment film 42 and the second substrate 20. The first alignment film 41 and the second alignment film 42 include, for example, polyimide. The initial alignment of the liquid crystal layer 30 is obtained by, for example, performing rubbing of the first alignment film 41 and the second alignment film 42. The direction of the rubbing of the first alignment film 41 is antiparallel to the direction of the rubbing of the second alignment film 42. The initial alignment may be obtained by performing light irradiation of the first alignment film 41 and the second alignment film 42.

The thicknesses of the first alignment film 41 and the second alignment film 42 are, for example, 100 nm (e.g., not less than 30 nm and not more than 300 nm). The distance in the Z-axis direction between the liquid crystal layer 30 and each of the multiple first electrode units 11 is, for example, not less than 30 nm and not more than 300 nm.

The case will now be described where the dielectric anisotropy of the liquid crystal included in the liquid crystal layer 30 is positive and the initial alignment is the horizontal alignment.

By applying voltages between the counter electrode 21 and the first electrode units 11, an electric field acts on the liquid crystal molecules of the liquid crystal layer 30; and the liquid crystal alignment changes. A refractive index distribution is formed in the liquid crystal layer 30 according to this change; and the travel direction of the light that is incident on the liquid crystal optical element 111 is changed by the refractive index distribution. The change of the travel direction of the light is mainly based on the refraction effect.

The image display unit 80 includes the display unit 82 and a light source unit 84. The display unit 82 and the light source unit 84 are stacked with the liquid crystal optical element 111. The display unit 82 and the light source unit 84 are stacked with the liquid crystal lens device 211 (the liquid crystal optical element 111) in a third direction intersecting the first direction and the second direction. The third direction is, for example, the Z-axis direction. The third direction is not limited to the Z-axis direction and may be any direction intersecting the first direction and the second direction. In the example, the display unit 82 is provided between the liquid crystal optical element 111 and the light source unit 84. The light source unit 84 irradiates light toward the display unit 82. The display unit 82 transmits the light that is incident and emits light including image information. In other words, in the example, the display unit 82 is a transmission-type display device. The light source unit 84 is a so-called backlight. The display unit 82 causes the light including the image information to be incident on the liquid crystal optical element 111. For example, the light source unit 84 may be omitted in the case where the display unit 82 includes a self-emitting display device such as an organic EL display device or the like.

The image display unit 80 may further include a display controller 86 that controls the display unit 82. The display unit 82 produces light that is modulated based on the signal supplied from the display controller 86. For example, the display unit 82 emits light that includes multiple parallax images.

The drive unit 70 may be connected to the display controller 86 by a wired or wireless method (an electrical method, an optical method, etc.). The image display device 311 may further include a controller (not shown) that controls the drive unit 70 and the display controller 86.

The display unit 82 has a display surface 82a. The display unit 82 emits the light including the image information from the display surface 82a. For example, the display surface 82a has a rectangular configuration. The liquid crystal optical element 111 is provided on the display surface 82a. The length in the Y-axis direction of the first electrode units 11 is slightly longer than the length in the Y-axis direction of the display surface 82a. The first electrode units 11 cross the display surface 82a in the Y-axis direction.

The display unit 82 includes the multiple pixels PX aligned in a two-dimensional matrix configuration. The multiple pixels PX are arranged in the X-axis direction and the Y-axis direction. The display surface 82a is formed of the multiple pixels PX.

The region that is between two most proximal first electrode units 11 opposes multiple pixels PX arranged in the X-axis direction. In the example, the region between the two most proximal first electrode units 11 opposes four pixels PX arranged in the X-axis direction. In other words, the spacing of the multiple first electrode units 11 is wider than the spacing in the X-axis direction of the multiple pixels PX. The number of multiple pixels PX arranged in the X-axis direction to oppose the region between the two most proximal first electrode units 11 is not limited to four and may be two, three, five, or more.

For example, the display unit 82 emits light including the image displayed on the display surface 82a. The light is in a linearly polarized light state traveling substantially in the Z-axis direction. The polarizing axis of the linearly polarized light (the orientation axis in the X-Y plane which is the vibration plane of the electric field) is the X-axis direction. In other words, the polarizing axis of the linearly polarized light is a direction parallel to the director (the long axis) of the liquid crystal molecules. For example, the linearly polarized light is formed by disposing an optical filter (a polarizer) having the X-axis direction as the polarizing axis in the optical path.

According to the embodiment, a refractive index distribution having a good convex lens configuration can be formed in the liquid crystal layer 30 according to the liquid crystal lens device 211 and the image display device 311 according to the embodiment. For example, the decrease of the lens condensing performance can be suppressed. For example, a high-quality 3D display can be provided.

Second Embodiment

Figure 5:
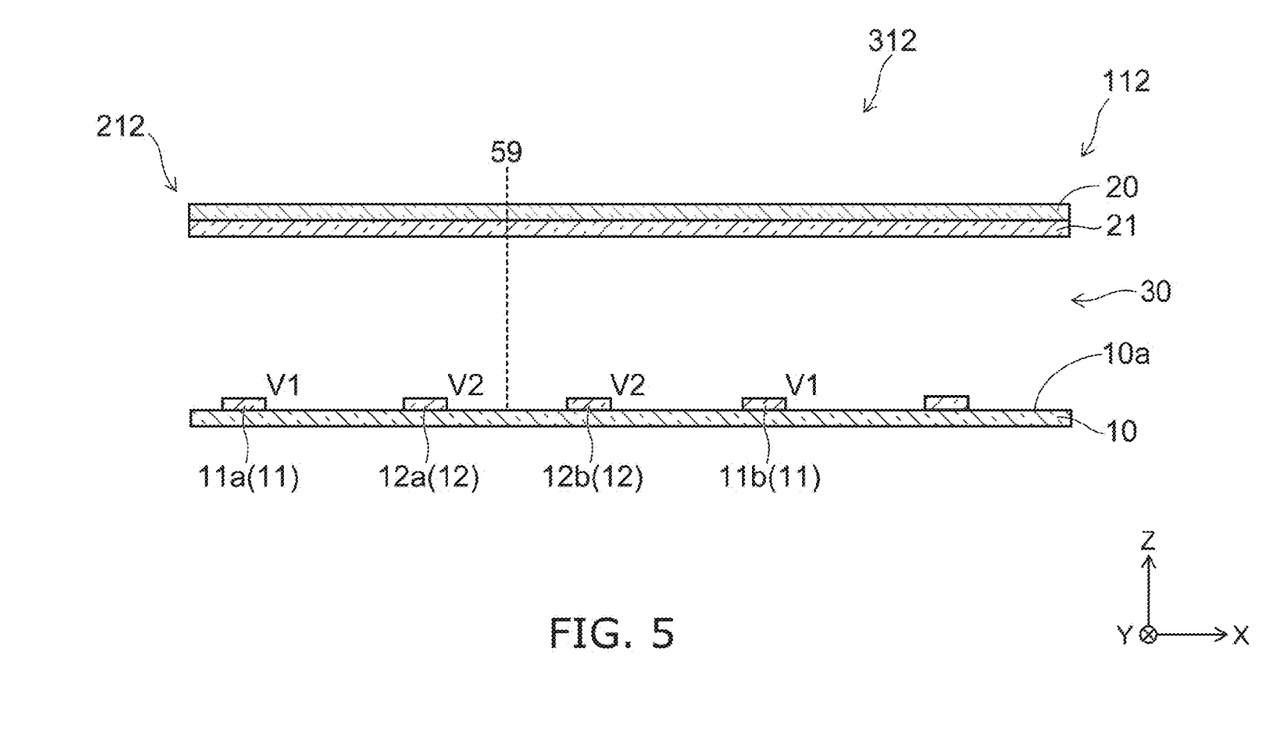
FIG. 5 is a schematic cross-sectional view showing a liquid crystal lens device and an image display device according to a second embodiment.

FIG. 5 is a schematic cross-sectional view showing a liquid crystal lens device and an image display device according to a second embodiment.

As shown in FIG. 5, the image display device 312 and the liquid crystal lens device 212 include a liquid crystal optical element 112. In the example, the drive unit 70 and the image display unit 80 are not shown.

The liquid crystal optical element 112 includes the first substrate 10. Multiple second electrode units 12 are further provided on the first major surface 10a of the first substrate 10. The multiple second electrode units 12 include a first sub electrode 12a and a second sub electrode 12b. The first sub electrode 12a is provided between the first major electrode 11a and the central axis 59. The second sub electrode 12b is provided between the second major electrode 11b and the central axis 59. The first sub electrode 12a and the second sub electrode 12b are arranged with the central axis 59 interposed when projected onto a plane (the X-Y plane) parallel to the X-axis direction and the Y-axis direction. The second electrode units 12 are light-transmissive. The second electrode units 12 are, for example, transparent. The second electrode units 12 may include, for example, the material described in reference to the first electrode units 11.

The drive unit 70 sets the absolute value of the potential difference between the first sub electrode 12a and the counter electrode 21 and between the second sub electrode 12b and the counter electrode 21 to V2. In the example, there are two second electrode units 12. In other words, V2 is the absolute value of the voltage between the counter electrode 21 and each of the multiple second electrode units 12. Hereinbelow, the absolute value of the voltage is called the second voltage V2 for convenience. The drive unit 70 applies the second voltage V2 between the counter electrode 21 and each of the multiple second electrode units 12. The first voltage V1 is set to a value that is higher than the second voltage V2. That is, the relationship of V1>V2 is satisfied.

Thus, in the region where the electric field effect of the first electrode units 11 is weaker, the electric field due to the second electrode units 12 is caused to act easily; and the refractive index distribution of the convex lens configuration is formed more easily. Thereby, for example, the condensing performance of the refractive index distribution having the convex lens configuration can be improved further. An electrode may be further provided on the central axis 59 to more easily adjust the refractive index distribution having the convex lens configuration.

The first voltage V1 that is applied to the first electrode units 11 is higher than the second voltage V2 that is applied to the second electrode units 12. In the liquid crystal layer 30, a strong electric field effect occurs at a vicinity positioned the distance d1 (a distance equal to the thickness of the liquid crystal layer 30) away from the first electrode units 11 in the X-axis direction. When the action of the electric field is too strong, liquid crystal alignment disorder occurs; the refractive index distribution becomes concave easily (referring to FIG. 3B); and the refractive index distribution undesirably approaches a prism configuration (referring to FIG. 3C). Conversely, when the action of the electric field is too weak, the lens center vicinity of the refractive index distribution undesirably becomes flattened (referring to FIG. 3D). The strength with which the electric field acts is different according to the dielectric anisotropy Δε and the effective elastic constant $k_{eff}$ of the liquid crystal material.

The number of second electrodes disposed between the two most proximal first electrode units 11 is not limited to two and may be three ore more. Electrodes other than the second electrode units 12 may be further provided between the two most proximal first electrode units 11.

According to the liquid crystal lens device 212 and the image display device 312 according to the embodiment, by adding the second electrodes, a refractive index distribution having a favorable convex lens configuration can be formed in the liquid crystal layer 30. For example, the decrease of the lens condensing performance can be suppressed. For example, a high-quality 3D display can be provided.

Here, the drive unit 70 may set the absolute value of the potential difference between the first sub electrode 12a and the counter electrode 21 and between the second sub electrode 12b and the counter electrode 21 to be V3. In other words, V3 is the absolute value of the voltage between the counter electrode 21 and each of the multiple second electrode units 12. Hereinbelow, V3 is called the third voltage V3 for convenience. The drive unit 70 applies the third voltage V3 between the counter electrode 21 and each of the multiple second electrode units 12. The third voltage V3 is set to a value that is higher than the second voltage V2 and lower than the first voltage V1. That is, the relationship of V1>V3>V2 is satisfied. In such a case, the electric field due to the second electrode units 12 can be caused to act more strongly. Thereby, for example, a refractive index distribution having a Fresnel lens-like configuration can be formed.

Third Embodiment

Figure 6:
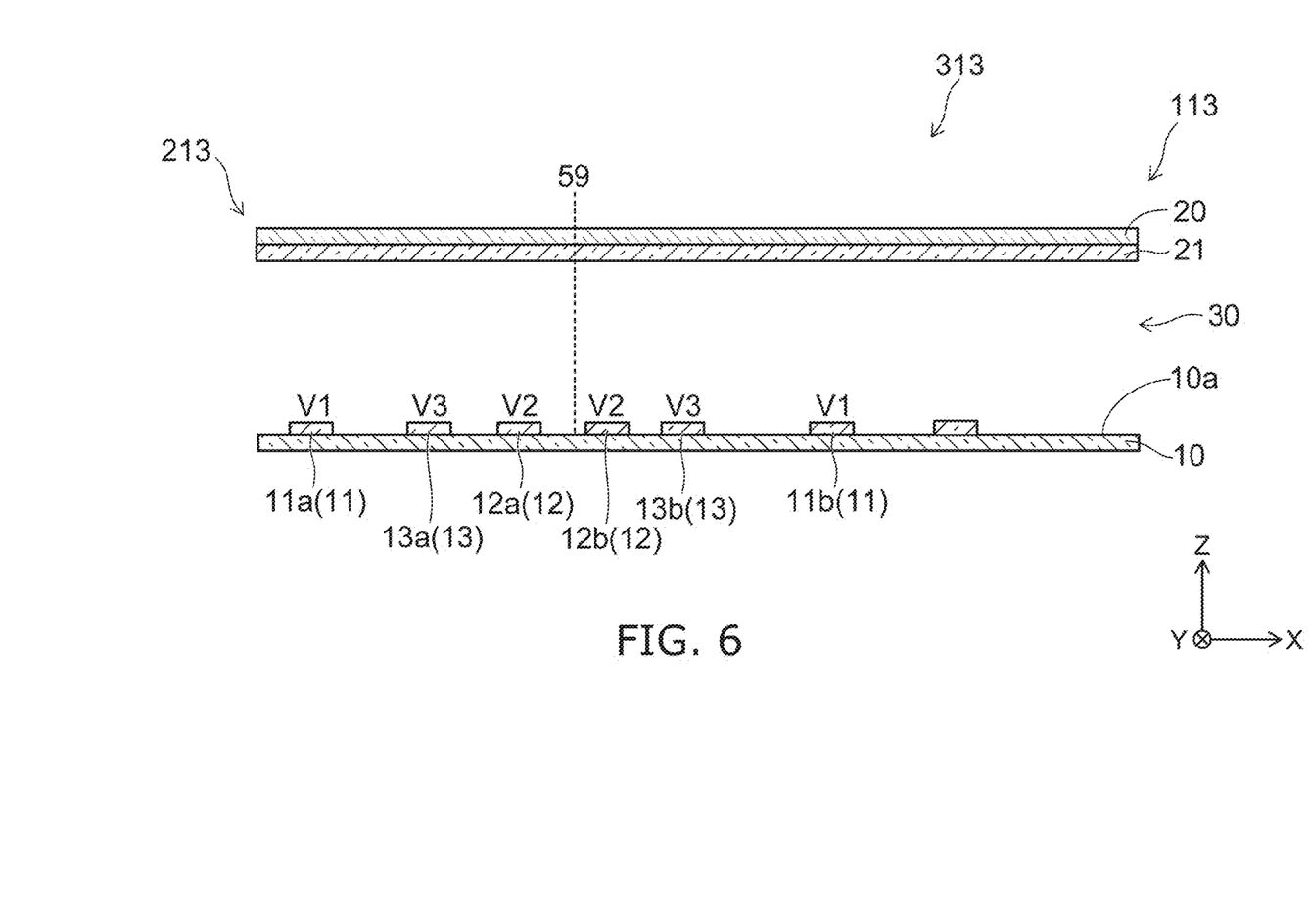
FIG. 6 is a schematic cross-sectional view showing a liquid crystal lens device and an image display device according to a third embodiment.

FIG. 6 is a schematic cross-sectional view showing a liquid crystal lens device and an image display device according to a third embodiment.

As shown in FIG. 6, the image display device 313 and the liquid crystal lens device 213 include a liquid crystal optical element 113. In the example, the drive unit 70 and the image display unit 80 are not shown.

The liquid crystal optical element 113 includes the first substrate 10. In addition to the multiple second electrode units 12, multiple third electrode units 13 are further provided on the first major surface 10a of the first substrate 10. The multiple third electrode units 13 include a third sub electrode 13a and a fourth sub electrode 13b. The third sub electrode 13a is provided between the first major electrode 11a and the first sub electrode 12a. The fourth sub electrode 13b is provided between the second major electrode 11b and the second sub electrode 12b. The third sub electrode 13a and the fourth sub electrode 13b are arranged with the central axis 59 interposed when projected onto a plane (the X-Y plane) parallel to the X-axis direction and the Y-axis direction. The third electrode units 13 are light-transmissive. The third electrode units 13 are, for example, transparent. The third electrode units 13 may include, for example, the material described in reference to the first electrode units 11.

The drive unit 70 sets the absolute value of the potential difference between the third sub electrode 13a and the counter electrode 21 and between the fourth sub electrode 13b and the counter electrode 21 to V3. In other words, V3 is the absolute value of the voltage between the counter electrode 21 and each of the multiple third electrode units 13. The absolute value of the voltage is set to the third voltage V3. The drive unit 70 applies the third voltage V3 between the counter electrode 21 and each of the multiple third electrode units 13. The third voltage V3 is set to a value that is lower than the first voltage V1 and higher than the second voltage V2. That is, the relationship of V2<V3<V1 is satisfied.

In the structure in which the two third electrode units 13 are provided in addition to the two second electrode units 12, the refractive index distribution can be formed in a Fresnel lens-like configuration; and it is possible for the thickness d1 of the liquid crystal layer 30 to be thinner.

Figure 7:
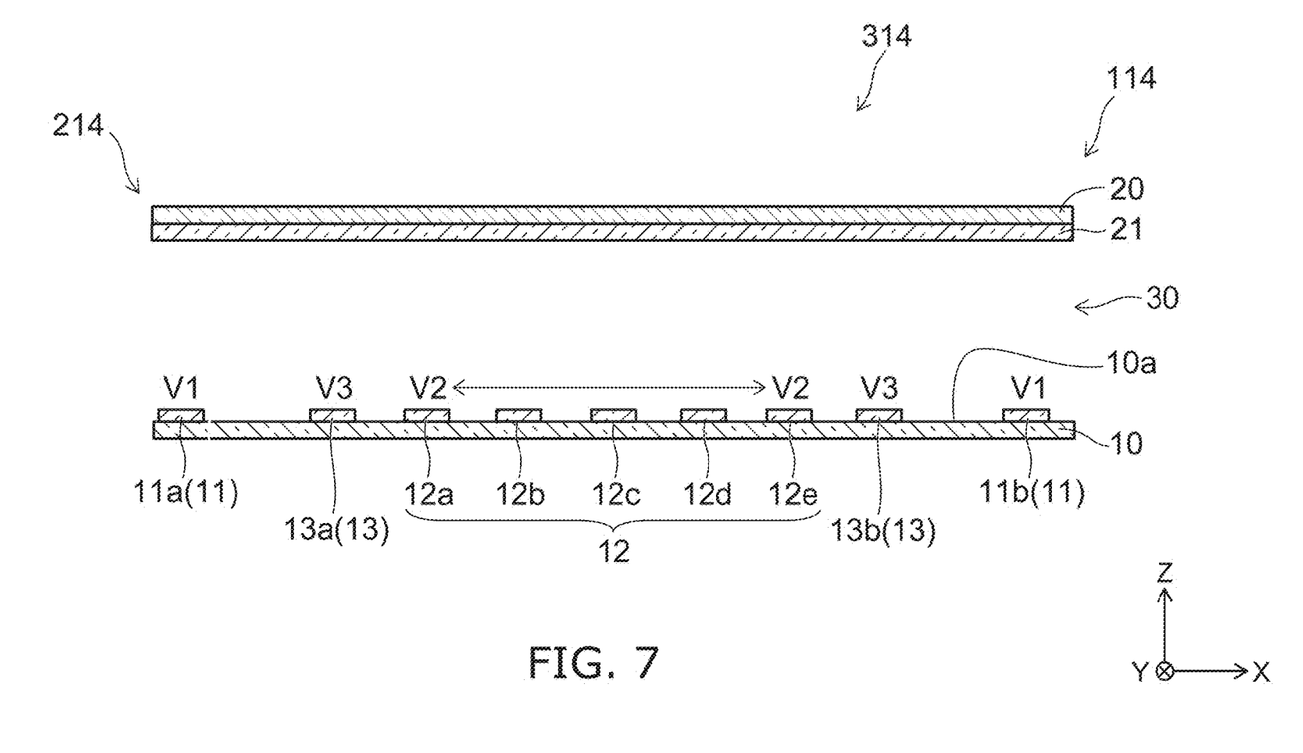
FIG. 7 is a schematic cross-sectional view showing another liquid crystal lens device and another image display device according to the third embodiment.

FIG. 7 is a schematic cross-sectional view showing another liquid crystal lens device and another image display device according to the third embodiment.

As shown in FIG. 7, the image display device 314 and the liquid crystal lens device 214 include a liquid crystal optical element 114. In the example, the drive unit 70 and the image display unit 80 are not shown.

The liquid crystal optical element 114 includes the first substrate 10. Two third electrode units 13 and three or more second electrode units 12 are further provided on the first major surface 10a of the first substrate 10. In the example, five second electrode units 12 are provided between the third sub electrode 13a and the fourth sub electrode 13b. That is, fifth to seventh sub electrodes 12c to 12e are provided in addition to the first sub electrode 12a and the second sub electrode 12b. The second electrode units 12 may be provided between the first major electrode 11a and the third sub electrode 13a and between the second major electrode 11b and the fourth sub electrode 13b.

Thus, in the structure in which the two third electrode units 13 and the three or more second electrode units 12 are provided, it is easy to reduce the degradation of the curved portions or the Fresnel jump portions of the refractive index distribution; and the condensing performance of the refractive index distribution can be improved further.

According to the liquid crystal lens devices 213 and 214 and the image display devices 313 and 314 according to the embodiment, by adding the third electrodes, a refractive index distribution having a good Fresnel lens-like configuration can be formed in the liquid crystal layer 30. For example, the decrease of the lens condensing performance can be suppressed. For example, a high-quality 3D display can be provided.

In the embodiments recited above, the display unit 82 includes a transmission-type display device. The display unit 82 is not limited thereto and may include, for example, a reflection-type display device. In the case where the display unit 82 includes the reflection-type display device, the light source unit 84 may be omitted. In the case where the display unit 82 includes the reflection-type display device, for example, a front-light type light source unit 84 may be used. For example, the liquid crystal optical element 111 may be provided on the display surface 82a of the display unit 82; and the light source unit 84 may be provided on the liquid crystal optical element 111.

According to the embodiments, a liquid crystal lens device and an image display device that provide a high-quality display can be provided.

Hereinabove, embodiments of the invention are described with reference to specific examples. However, the invention is not limited to these specific examples. For example, one skilled in the art may similarly practice the invention by appropriately selecting specific configurations of components such as the first electrode, the second electrode, the counter electrode, the liquid crystal layer, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all liquid crystal lens devices and image display devices practicable by an appropriate design modification by one skilled in the art based on the liquid crystal lens devices and the image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal lens device, comprising:
a first electrode unit including a first electrode and a second electrode, the first electrode extending in a first direction, the second electrode extending in the first direction and being arranged with the first electrode in a second direction, the second direction intersecting the first direction;
a counter electrode;
a liquid crystal layer provided between the first electrode unit and the counter electrode;
a central axis parallel to the first direction and passing through a midpoint of a line segment connecting the center in the second direction of the first electrode and the center in the second direction of the second electrode; and
a second electrode unit including a first sub electrode and a second sub electrode, the first sub electrode being provided between the first electrode and the central axis, the second sub electrode being provided between the second electrode and the central axis,
a threshold voltage Vth of the liquid crystal layer, an absolute value V1 of a potential difference between the first electrode and the counter electrode, a distance P1 (micrometers) between a center in the second direction of the first electrode and a center in the second direction of the second electrode, a thickness d1 (micrometers) of the liquid crystal layer in a third direction intersecting the first direction and the second direction, an effective elastic constant $k_{eff}$ (piconewtons) of the liquid crystal layer, a dielectric anisotropy $\Delta\varepsilon$ of the liquid crystal layer, and a dielectric constant $\varepsilon 0$ of a vacuum satisfying $$V1 > Vth \times (P1/2)/d1,$$

$$V1 < Vth \times (P1/d1), \text{ and}$$

$$(P1/2)/d1 < \varepsilon 0 \times (\Delta\varepsilon/k_{eff}),$$

an absolute value V2 of a potential difference between the first sub electrode and the counter electrode satisfying $$V2 < V1.$$

2. A liquid crystal lens device, comprising:
a first electrode unit including a first electrode and a second electrode, the first electrode extending in a first direction, the second electrode extending in the first direction and being arranged with the first electrode in a second direction, the second direction intersecting the first direction;
a counter electrode;
a liquid crystal layer provided between the first electrode unit and the counter electrode;

a central axis parallel to the first direction and passing through a midpoint of a line segment connecting the center in the second direction of the first electrode and the center in the second direction of the second electrode; and
a second electrode unit including a first sub electrode and a second sub electrode, the first sub electrode being provided between the first electrode and the central axis, the second sub electrode being provided between the second electrode and the central axis,
a threshold voltage Vth of the liquid crystal layer, an absolute value V1 of a potential difference between the first electrode and the counter electrode, a focal length f of the liquid crystal layer, a distance P1 (micrometers) between a center in the second direction of the first electrode and a center in the second direction of the second electrode, a thickness d1 (micrometers) of the liquid crystal layer in a third direction intersecting the first direction and the second direction, an effective elastic constant $k_{eff}$ (piconewtons) of the liquid crystal layer, a dielectric anisotropy $\Delta\varepsilon$ of the liquid crystal layer, and a dielectric constant ε0 of a vacuum satisfying $V1 > Vth \times (f/P1)$, $V1 < Vth \times (P1/d1)$, and $(P1/2)/d1 < \varepsilon 0 \times (\Delta\varepsilon/k_{eff})$ an absolute value V2 of a potential difference between the first sub electrode and the counter electrode satisfying $V2 < V1$.

3. The liquid crystal lens device according to claim 1, wherein the threshold voltage Vth satisfies

[Formula 1]

$$Vth = \pi \sqrt{\frac{K_{eff}}{\varepsilon 0 \Delta\varepsilon}}. \qquad (1)$$

4. The liquid crystal lens device according to claim 1, wherein
an absolute value V3 of the potential difference between the first sub electrode and the counter electrode satisfies $V2 < V3 < V1$.

5. The liquid crystal lens device according to claim 1, further comprising a third electrode unit including a third sub electrode and a fourth sub electrode, the third sub electrode being provided between the first electrode and the first sub electrode, the fourth sub electrode being provided between the second electrode and the second sub electrode, an absolute value V3 of a potential difference between the third sub electrode and the counter electrode satisfying $V2 < V3 < V1$.

6. The liquid crystal lens device according to claim 1, wherein the thickness d1 satisfies $d1 \leq P1/2$.

7. The liquid crystal lens device according to claim 1, wherein the thickness d1 satisfies $d1 \leq P1/4$.

8. The liquid crystal lens device according to claim 1, further comprising a drive unit electrically connected to the first electrode unit and the counter electrode.

9. An image display device, comprising:
a liquid crystal lens device; and
an image display unit,
the liquid crystal lens device including
a first electrode unit including a first electrode and a second electrode, the first electrode extending in a first direction, the second electrode extending in the first direction and being arranged with the first electrode in a second direction, the second direction intersecting the first direction,
a counter electrode,
a liquid crystal layer provided between the first electrode unit and the counter electrode,
a central axis parallel to the first direction and passing through a midpoint of a line segment connecting the center in the second direction of the first electrode and the center in the second direction of the second electrode, and
a second electrode unit including a first sub electrode and a second sub electrode, the first sub electrode being provided between the first electrode and the central axis, the second sub electrode being provided between the second electrode and the central axis,
a threshold voltage Vth of the liquid crystal layer, an absolute value V1 of a potential difference between the first electrode and the counter electrode, a distance P1 (micrometers) between a center in the second direction of the first electrode and a center in the second direction of the second electrode, a thickness d1 (micrometers) of the liquid crystal layer in a third direction intersecting the first direction and the second direction, an effective elastic constant $k_{eff}$ (piconewtons) of the liquid crystal layer, a dielectric anisotropy $\Delta\varepsilon$ of the liquid crystal layer, and a dielectric constant ε0 of a vacuum satisfying $V1 > Vth \times (P1/2)/d1$, $V1 < Vth \times (P1/d1)$, and $(P1/2)/d1 < \varepsilon 0 \times (\Delta\varepsilon/k_{eff})$, an absolute value V2 of a potential difference between the first sub electrode and the counter electrode satisfying $V2 < V1$ the image display unit including a display unit emitting light including image information, the image display unit and the liquid crystal lens device overlapping in the third direction.

10. The image display device according to claim 9, wherein the threshold voltage Vth satisfies

[Formula 1]

$$Vth = \pi \sqrt{\frac{K_{eff}}{\varepsilon 0 \Delta\varepsilon}}. \qquad (1)$$

11. The image display device according to claim 9, wherein an absolute value V3 of the potential difference between the first sub electrode and the counter electrode satisfies $V2 < V3 < V1$.

12. The image display device according to claim 9, further comprising a third electrode unit including a third sub electrode and a fourth sub electrode, the third sub electrode being provided between the first electrode and the first sub electrode, the fourth sub electrode being provided between the second electrode and the second sub electrode, an absolute value V3 of a potential difference between the third sub electrode and the counter electrode satisfying $V2<V3<V1.$ 13. The image display device according to claim 9, wherein the thickness d1 satisfies $d1 \leq P1/2.$ 14. The image display device according to claim 9, wherein the thickness d1 satisfies $d1 \leq P1/4.$ 15. The image display device according to claim 9, further comprising a drive unit electrically connected to the first electrode unit and the counter electrode.

* * * * *